United States Patent Office 2,778,145
Patented Jan. 22, 1957

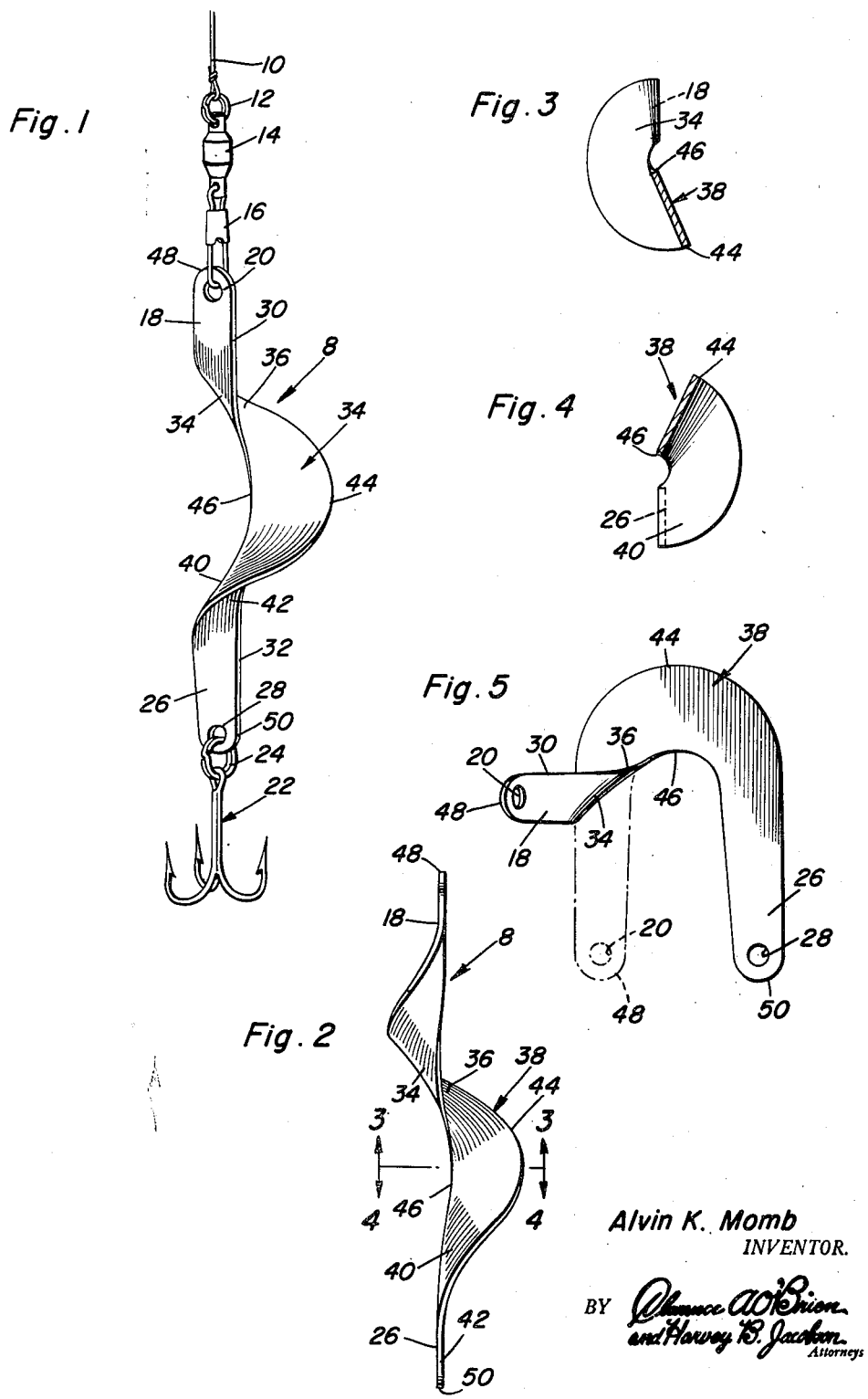

2,778,145

FISHING LURE

Alvin K. Momb, Dunseith, N. Dak.

Application March 18, 1955, Serial No. 495,131

1 Claim. (Cl. 43—42.51)

The present invention relates to an improved lure which anglers call a screw type lure, which rotates and weaves and functions satisfactorily when trolling, casting, still fishing and especially when ice fishing.

Keeping in mind that deception and imitation are still basic to the use of artificial lures for catching fish, it is an object in the instant presentation to provide a simple, economical and practical non-corrodible shiny finished metal or equivalent strip which is novelly bent intermediate its ends to provide a rotating or revolving lure which screws and carves its way through the water and resembles a live worm ambling on its way.

Stated otherwise, it is an object of the invention to attract and decoy a fish to this improved hook equipped baited lure under the illusion that the lure is a sinuously moving live bait which has an in and out winding effect as it rotates in one direction as it is dangled through an ice hole when it descends into the water and rotates in a reverse direction as it is lifted and caused to ascend through the water.

Other objects, features and advantages will become more readily apparent from the following description and the accompanying sheet of illustrative drawings.

In the drawings:

Figure 1 is a view showing the improved lure dangling from a vertically held line and appearing in perspective;

Figure 2 is a front edge elevational view of the same lure minus the fishhook, line and connections therefor;

Figures 3 and 4 are sections on the line 3—3 and 4—4 of Figure 2; and

Figure 5 is a view of the U-shaped or horseshoe-shaped sheet metal blank from which the finished lure seen in Figures 1 and 2 is constructed.

Referring now the drawings by way of reference numerals, the improved lure (Figures 1 and 2) is denoted, as an entity, by the numeral 8. The numeral 10 designates a fishing line or leader connected to a split ring 12 joined to a barrel type swivel 14 and a separable fastener 16 connected to what may be described as the anterior or leading end portion 18 of the lure, this by way of the hole or eye 20. A triple prong or equivalent fishhook 22 is connected by a split ring 24 to the posterior or trailing end portion 26 by way of the hole or eye 28. The leading and trailing end portions are of equal thickness, as is the entire lure, and are essentially flat faced members. As brought out best in Figure 2, these portions are in substantially the same common plane and are in lengthwise alignment and rotate about the same common center. Also, as brought out in Figure 1, the two cooperating edges 30 and 32 are approximately in line with one another.

The leading end 18 (the upper end in Figures 1 and 2) is joined by a transverse bend 34 and a cooperating twist 36 to the adjacent end of the intermediate body portion 38. There is a similar transverse bend 40 and a twist 42 in the same direction as the twist 36 providing the junctional connection between the lower or corresponding end of the trailing end 26 and body portion 38. The bends and twists result in a screw-like structure. The body portion is a peculiarly shaped crook, and is here conveniently described as a U-shaped bend having an outer curved or convex edge 44 and an inner curved concave edge 46.

The leading end 18 may be said to range from the bend 34 to the rounded tip 48 and the trailing end 26 from the bend 40 to the rounded tip 50. The junctional twists 36 and 42 provide the connection between the respective end portions of the body portion or U-bend and the leading and trailing end portions. It follows that the body portion is therefore essentially or primarily offset laterally to one side of the axial center line so that the end portions rotate within the limits of one circular path and the outermost marginal crown or edge 44 of the bight of the body portion revolves or rotates within the limits of a larger circular path. The construction is much like having a crank intermediate the axially aligned ends of a shaft with the crank having a throw in an orbital path different from that in which the axially aligned portions turn. It is to be noted, however, that the body portion is not continuously smooth. That is to say, it has an irregular gradual twist which gives it the somewhat dished appearance seen perhaps best in Figure 1. It will also be observed that the body portion is somewhat wider than the end portions 18 and 26 and is sufficiently wide or broad to present satisfactory thrust surfaces to the water and obviously, the faster the lure is pulled through the water, the faster the three blade-like portions 18, 26 and 38 function to spin the lure. This action is controlled by whether it is presumed that the fish will take a slow or fast moving bait, as is recognized by anglers.

Experience has shown that by using lightweight metal in making the lure from the U-shaped blank seen in Figure 5, the end portions can be twisted to desired shape with a pair of pliers. When, however, made out of heavier sheet metal, a pair of pliers or a vise is used to hold the lure at the bight portion of the lure and twisted into shape with a pair of pliers. It will be understood, however, that a lure like this is capable of being molded from commercial plastics of proper grade, rigidity and heaviness. The functioning of this lure can best be visualized by assuming that in Figure 1, for example, the lure is to be baited and dropped down through a hole in an ice covered body of water where this lure is especially advantageous in use. As the line is allowed to lower or descend, the water acting on the surfaces of the lure, particularly the slow curved U-shaped body portion, will cause the lure to rotate in one direction, say from right to left in Figure 1. By pulling up on the line and causing the lure to ascend, the opposite effect is had, and the lure turns, obviously, in an opposite direction. It follows that this is a spinner type lure, where the whole lure spins around and has sometimes been called a spiralling type or screw action lure.

Minor changes in shape, size, materials and slight reshaping of the components may be resorted to, in actual practice, without departing from tthe spirit of the invention or the scope of the subjoined claim.

What is claimed as new is as follows:

A screw type lure which revolves in a spiralling manner when trolled or similarly propelled through a body of water and decoys a fish thereto under the illusion that said lure is a sinuously twisting live bait, comprising a rigid strip member embodying a leading end portion, a trailing end portion, and an intervening body portion, said end portions being approximately flat and otherwise basically the same in construction, being substantially in a plane which is common to both and being longitudinally aligned with each other and therefore rotatable around a common axial center line, and said body portion being only a single U-shaped bend which is laterally offset and has a convex outer marginal edge furtherest from the axial center line and a concave inner marginal edge nearer the axial center line and which is in a position which is wholly to one side of said axial center line, said leading end portion having an eye formed therein, and a swivel directly connected to said eye, whereby said end portions rotate within the limits of a relatively small circular path and the outermost marginal edge portion of the bight of said body portion rotates within the limits of an appreciably larger circular path, the inner end of said leading end portion being joined to the adjacent end of the said body portion by a first twist and the inner end of the trailing end portion being joined to the adjacent end of said body portion by a second twist, and said twists turning in the same direction.

References Cited in the file of this patent

UNITED STATES PATENTS

| | | |
|---|---|---|
| D. 152,542 | Howard | Feb. 1, 1949 |
| D. 153,147 | Greene | Mar. 22, 1949 |
| 323,111 | Chapman | July 28, 1885 |
| 817,257 | Lee | Apr. 10, 1906 |
| 1,393,790 | Kenney | Oct. 18, 1921 |
| 1,831,267 | Schwarz | Nov. 10, 1931 |
| 2,429,568 | Stevermer | Oct. 21, 1947 |
| 2,606,387 | Garner | Aug. 12, 1952 |

FOREIGN PATENTS

| | | |
|---|---|---|
| 119,475 | Australia | Jan. 17, 1945 |
| 612,352 | France | July 31, 1926 |